United States Patent [19]

Kilthau et al.

[11] Patent Number: 4,948,152

[45] Date of Patent: Aug. 14, 1990

[54] SHAFT SEAL

[75] Inventors: Gerhard Kilthau, Mannheim; Karl H. Spies, Birkenau; Rolf Vogt, Oftersheim; Peter Freilaender, Mannheim; Toni Seethaler, Gorxheimertal, all of Fed. Rep. of Germany

[73] Assignee: Firma Carl Freudenberg, Weinheim/Bergstrasse, Fed. Rep. of Germany

[21] Appl. No.: 303,820

[22] Filed: Jan. 30, 1989

[30] Foreign Application Priority Data

Feb. 17, 1988 [DE] Fed. Rep. of Germany ....... 3804844

[51] Int. Cl.$^5$ ................................................ F16J 15/40
[52] U.S. Cl. .......................................... 277/80; 277/53; 277/133; 277/134
[58] Field of Search ...................... 277/53, 80, 133, 58, 277/134, 13

[56] References Cited

U.S. PATENT DOCUMENTS

| 3,726,574 | 4/1973 | Tuffias et al. | 277/80 |
| 3,746,407 | 7/1973 | Stiles et al. | 277/80 |
| 3,788,275 | 1/1974 | Hanson | 277/80 X |
| 3,834,775 | 9/1074 | Tuffias et al. | 277/80 |
| 4,486,026 | 12/1984 | Furumura et al. | 277/133 |
| 4,598,914 | 7/1986 | Furumura et al. | 277/135 |

FOREIGN PATENT DOCUMENTS 266874 11/1986 Japan ...................................... 277/80

OTHER PUBLICATIONS

Article from Machine Design entitled "Magnetic-Fluid Seals", published 3/28/68, pp. 145-149.

Primary Examiner—Allan N. Shoap
Assistant Examiner—Jeffrey Hohenshell
Attorney, Agent, or Firm—Milde & Robinson

[57] ABSTRACT

A seal for the gap between two relatively rotatable machine parts, in which at least one of the two confronting surfaces is provided with at least one helical groove which has a pumping action toward the sealed space, and in which a preliminary seal is situated ahead of the helical groove on the side facing away from the sealed space. The preliminary seal includes a ring magnet which reaches close to the opposite surface except for a narrow gap. This gap is filled with a ferrofluid, and the radial width of the gap is substantially the same as the distance separating the helical ridges between the helical grooves from the surfaces opposite them.

3 Claims, 3 Drawing Sheets

SHAFT SEAL

BACKGROUND OF THE INVENTION

The present invention relates to a seal for the interstice between the confronting surfaces of two relatively rotatable machine parts. At least one of the two confronting surfaces is provided with at least one helical groove that imparts a pumping action toward the space to be sealed. The helical groove is preceded on the side remote from the sealed space by a preliminary seal.

A seal of this type is disclosed in the German Pat. Publication (DAS) No. 24 53 118. The preliminary seal in this case consists of screw threads which, on the side facing the ambient air, adjoin the area provided with the helical grooves. The pumping action that results when the shaft rotates is, like that of the helical grooves, in the direction of the sealed space. This pumping action results in a suction of the outside air and draws foreign particles into the area of the dynamic sealing zone. Considerable wear can be caused by this effect.

SUMMARY OF THE INVENTION

The principal object of the Present invention, therefore, is to improve a seal of the above-described type so that no undersirable suction will be exerted on the ambient air, thus achieving a longer useful life.

This object, as well as other objects which will become apparent from the discussion that follows, are achieved, according to the present invention, in that (1) the preliminary seal includes a ring magnet that is separated from the confronting, relatively rotatable surface by a narrow gap, (2) a ferrofluid is disposed in this gap, and (3) the gap has a radial width which is substantially identical to the radial distance between the ridges separating the helical grooves from one another and the shaft surface confronting the ridges.

The seal according to the invention operates as follows:

When the shaft is not running, the medium that is to be sealed—normally a lubricating oil—can enter into the helical grooves and come into direct contact with the ferrofluid. The two substances, however, are insoluble in one another, so that they do not intermix. The ferrofluid held in the magnetic field serves a static sealing function when the shaft is not rotating.

When the shaft is rotating, the pumping action exercised by the helical grooves in the direction of the sealed space manifests itself increasingly with increasing rotational speed. It finally results in a substantial emptying of the medium from the helical grooves.

In the area of the ferrofluid disposed between the ring magnet and the relatively rotatable surface no helical grooves are present, and in this area the two confronting surfaces are cylindrical. Even when the shaft is rotating, therefore, there is no intermixing of the ferrofluid with the medium nor any appreciable relative displacement of the ferrofluid.

At very high rotational speeds, the pumping action of the helical grooves can produce a certain suction in the direction of the sealed space. The ferrofluid can withstand this suction without appreciable displacement until a relatively high vacuum is reached. When such a high vacuum is reached, a brief, pulse-like lifting of the ferrofluid away from the relatively rotatable, confronting surface will take place and a pressure equalization will result. Immediately thereafter the complete contact between the ferrofluid and the confronting surface will be restored. The space to be sealed will thus be hermetically sealed again and foreign matter will no longer be able to penetrate into it.

It has been found that, during the extremely brief moment of opening of the ferrofluid described above, it is nearly impossible for foreign matter to penetrate into the space being sealed. This is probably due to the fact that the opening movement of the ferrofluid, in addition to being of extremely brief duration, involves only a very small segment of the otherwise circular ring of ferrofluid and amounts only to a lifting of the ferrofluid away from the surface confronting the ring magnet. The seal can therefore be considered as having a reliability never previously achieved. It likewise prevents the undesirable escape of the medium, or of vapors of the medium, into the environment. There are therefore no problems involved in using it in the vicinity of electronic equipment or medical apparatus.

An important advantage of the seal in accordance with the present invention is that, by the elimination of surfaces in sliding contact with one another, it is completely free of losses due to wear and friction and assures a seal of uniform quality over a long period of time. Consequently, even inspections to determine how much longer its sealing capacity will last become unnecessary.

The helical grooves and the ring magnet can be at an axial distance apart for the purpose of preventing intermixture of the ferrofluid with the medium in critical applications. It has been found especially desirable for the axial distance between them to be spanned by a cylindrical section, and for the cylindrical section, the ring magnet, and the ridges separating the helical grooves from one another to be at the same distance from the relatively rotatable surface.

By the above-specified dimensions and configuration of the cylindrical section, the development of turbulent flow of the medium in the area of the seal is prevented, as is its action on the ferrofluid. It therefore advantageously prevents any undesirable loss of its volume. The radial width of the gap in the area of the cylindrical section is generally between 0.02 and 0.2 mm.

The length of the gap in the cylindrical section is between 0.5 and 5.7 mm if the seal is of the usual dimensions. It can generally be calculated by the following formula:

$$\text{Gap length} \geqq \frac{D^2 - d^2}{(D + d \times 0.07)}$$

wherein D defines the housing diameter and d the shaft diameter in the area of the cylindrical section.

The pumping helix formed by the helical threads is preferably designed such that the vacuum produced when the shaft is rotating does not exceed the pressure retentivity of the ferrofluid seal by more than 0.05 bar. The air flow caused by this difference in pressure during the opening up of the ferrofluid is accordingly of very low velocity, which prevents ferrofluid droplets from being torn from the ferrofluid ring and carried into the sealed space and lost. This feature is thus of some importance to the useful life of the seal according to the invention.

The present invention will be further described hereinbelow with the aid of the accompanying drawings which show the individual preferred embodiments in section.

DESCRIPTION OF THE PREFERRED EMBODIMENTS

The preferred embodiments of the present invention will now be described with reference to FIGS. 1–5 of the drawings. An exemplary polarity of the fluidic seal magnets has been indicated by the letters "N" and "S", respectively, and the magnetic flux lines have been indicated by arrows.

Figure 1:
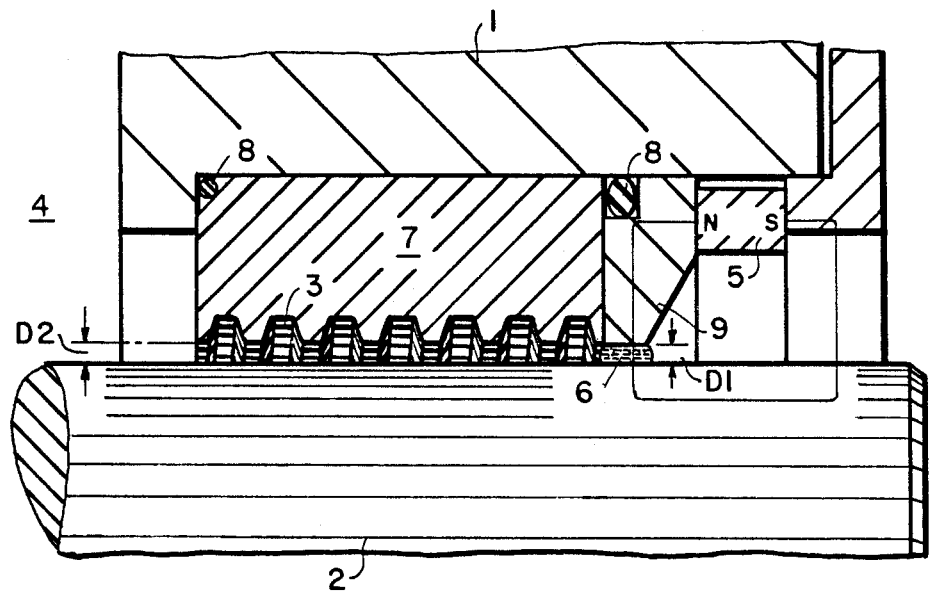
FIG. 1 is a longitudinal sectional view of a shaft seal, according to one preferred embodiment of the invention, in which the ring magnet and the helical grooves externally surround the cylindrical shaft to be sealed.

The seal shown in FIG. 1 serves for sealing the gap between a housing wall 1 and a steel shaft 2 which passes through it with radial clearance. It consists essentially of an insert 7 within which is a cylindrical bore into which helical threads are machined.

The insert 7 is sealed by O-rings 8 against the housing wall 1 and against the pole piece 9 which has a cylindrical bore within it. The diameter of this bore is as great as the inside diameter of the bore of the insert 7 such that the radial distance D1 across the gap 6 between the cylindrical inner surface of the pole piece 9 and the shaft 2 is substantially the same as the closest radial distance D2 between the insert 7 and the shaft 2. The Pole Piece 9 is of an annular configuration, and is made of a magnetic material. It lies against the face of the ring magnet 5.

In the annular gap 6 between the pole piece 9 and the surface of the shaft 2 there is disposed a ferrofluid. This fluid is fixed in this position by the magnetic field created in that area. The helical grooves 3 terminate at an axial distance from the gap 6 of the pole piece 9.

Operation of the shaft seal is as follows:

When the shaft is still, the medium to be sealed, which is usually oil, passes out of the space 4 to be sealed, into the helical grooves 3, and reaches the immediate vicinity of the ferrofluid in gap 6.

When the shaft is rotating, an induced flow in the direction of the space 4 develops on the surface of the shaft, resulting in a gradual emptying of the medium from the helical grooves 3. This has no effect on the ferrofluid in gap 6, because there are no helical grooves in this area, and the inside diameter of the pole piece 9 is the same as that of the insert 7.

At very great shaft speeds a certain vacuum can develop in the annular gap between the insert 7 and the surface of the shaft. If it exceeds a critical level, the ferrofluid in gap 6 will briefly part, and allow air to enter the annular gap, thereby permitting a compensation of the vacuum previously present. Immediately afterward the ferrofluid will resume its original circular shape which is characterized by full contact with the confronting surfaces of the pole piece and shaft. The entry of foreign matter is thereby prevented.

Figure 2:
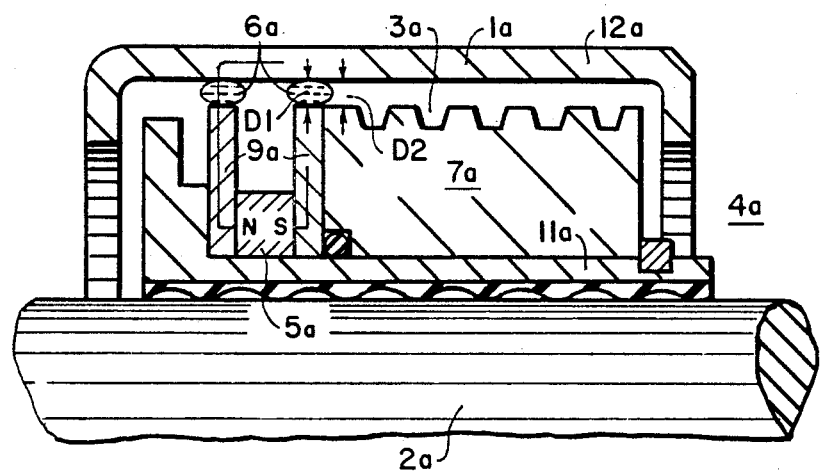
FIG. 2 is a longitudinal sectional view of a cassette seal, according to another preferred embodiment of the invention, for use in the annular gap between a rotating shaft and its housing, in which the relatively rotating surfaces consist of integrated parts of the cassette seal.
Figure 3:
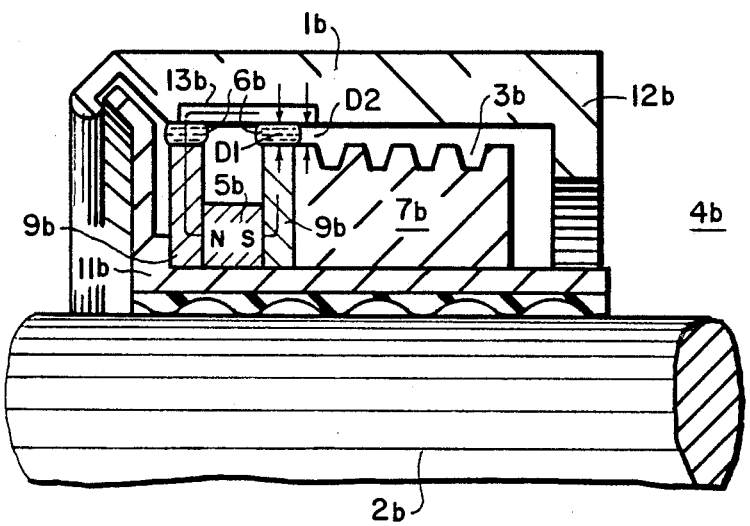
FIG. 3 is a longitudinal sectional view of a cassette seal embodiment similar to that of FIG. 2, in which important parts of the seal are produced from plastic.

FIGS. 2 and 3 illustrate cassette seals which operate in substantially the same manner as the seal of FIG. 1. The relatively rotatable machine parts which ar to be sealed against one another consist in these cases of integral components of the cassette seals, namely the inner rings 11a and 11b and the outer rings 12a and 12b. These components are interlocked together to prevent separation.

In both cases an insert piece 7a, 7b is fixed in a relatively nonrotatable and liquid-tight manner on the inner rings 11a, 11b, respectively. The insert piece is defined externally by a cylindrical surface and by a helical groove 3 created in this cylindrical surface. When the shaft 2 is rotating this groove produces a pumping action toward the space 4a, 4b being sealed. On the side facing away from the sealed space 4a, 4b and adjoining the insert 7a, 7b there is a ferrofluid sealing unit comprising a ring magnet 5a, 5b and pole pieces 9a, 9b. These pole pieces are pressed against opposite end faces of the ring magnet 5a, 5b; they have the same outside diameter as the insert 7a, 7b and come as close to the outside ring 12a, 12b. The outside ring 12a consists of sheet metal in the embodiment of FIG. 2. In the case of the embodiment in FIG. 3 the ring 12b consists of plastic, but an annular insert 13b of sheet steel is provided in the area where the outside ring axially overlaps the pole pieces 9b and the ring magnet 5b. Thus, the radial gaps between the pole pieces 9a, 9b and the radially confronting portions of the outside rings 12a, 12b are spanned by a stable magnetic field which is capable of stabilizing the position of the ferrofluid. The inner rings 11a, 11b are in both cases fixed nonrotatably to the surface of the shaft 2a, 2b by a coating of a rubber-elastic material. They are at the same time sealed by this coating against the surface.

Figure 4:
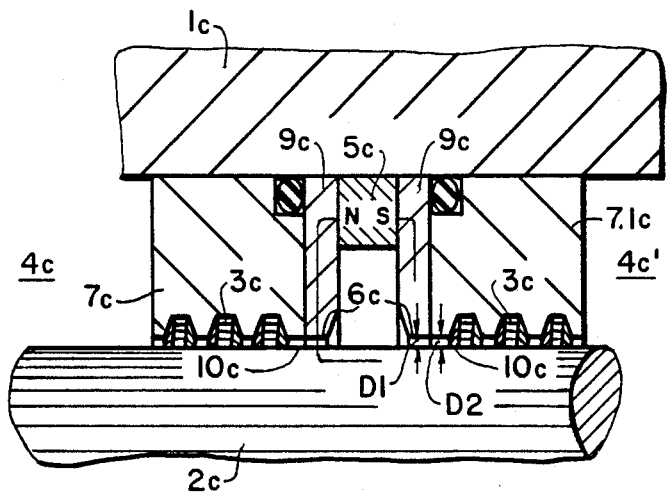
FIG. 4 is a longitudinal sectional view of two seals, similar to the embodiment in FIG. 1, in a back-to-back, mirror-image relationship.

In FIG. 4 is shown a construction involving two embodiments of the type shown in FIG. 1, in a back-to-back, mirror-image relationship. This construction is especially suitable for applications in which two chambers 4c and 4c' are to be sealed hermetically from one another. The pumping direction of the insert 7c shown on the left side must consequently be leftward, and that of the insert 7.1c shown on the right must be rightward. The helical grooves 3c are to be configured accordingly. They are separated from the inside cylindrical surface of the pole pieces 9c by a cylindrical section 10c of identical inside diameter.

Figure 5:
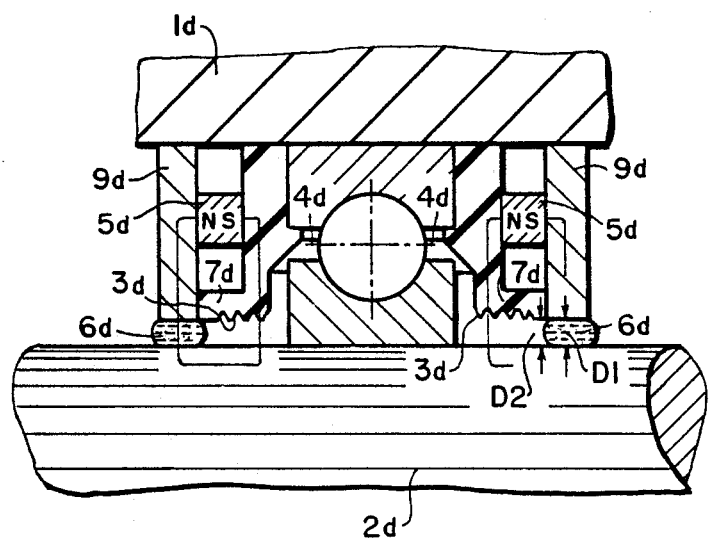
FIG. 5 is a longitudinal sectional view of two more seals, similar to the embodiment in FIG. 1, which are in a mirror-image relationship to one another and are used in conjunction with the bilateral sealing of a ball bearing.

FIG. 5 shows an embodiment similar to that of FIG. 4 which is applied to the sealing of a ball bearing. The space 4 that is to be sealed consists of the spaces between the individual balls. It is filled with grease, which is intended to assure the very easy running of the balls. The pumping direction of the helical grooves 3d in the two inserts 7d must accordingly be inward, unlike the embodiment in FIG. 4. The pole pieces 9d of the ring magnets 5d are accordingly provided on the outside of the arrangement.

There has thus been shown and described a novel shaft seal which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All changes, modifications, variations and other uses and applications which do not depart from the spirit and scope of the invention are deemed to be covered by the invention which is limited only by the following claims.

What is claimed is:

1. In a seal for the interstice between facing surfaces of two relatively rotatable machine parts, in which at least one of the two facing surfaces is provided in a first area with at least one helical groove separating ridges from one another that imparts a pumping action toward a space to be sealed, and in which said at least one helical groove is preceded, on the side remote from said sealed space, by a preliminary seal which is disposed in a second area, the improvement wherein said preliminary seal includes a ring magnet having a pole member defining a pole surface which is separated by a narrow gap from the other one of the two facing surfaces in said second area, the facing surfaces on opposite sides of said gap being cylindrical and smooth; wherein a ferrofluid is disposed in said gap; and wherein said gap has a radial width D1 which is substantially identical to the radial distance D2 between said ridges, on one hand, and said other facing surface, on the other.

2. The seal defined in claim 1, wherein said at least one helical groove and said pole member of said ring magnet are spaced apart at an axial distance.

3. The seal defined in claim 2, wherein said axial distance is spanned by a cylindrical section and wherein said cylindrical section, said pole surface and said ridges separating successive ones of said at least one helical groove from one another are at substantially the same distance from said other facing surface.

* * * * *